United States Patent Office 2,701,352
Patented Feb. 1, 1955

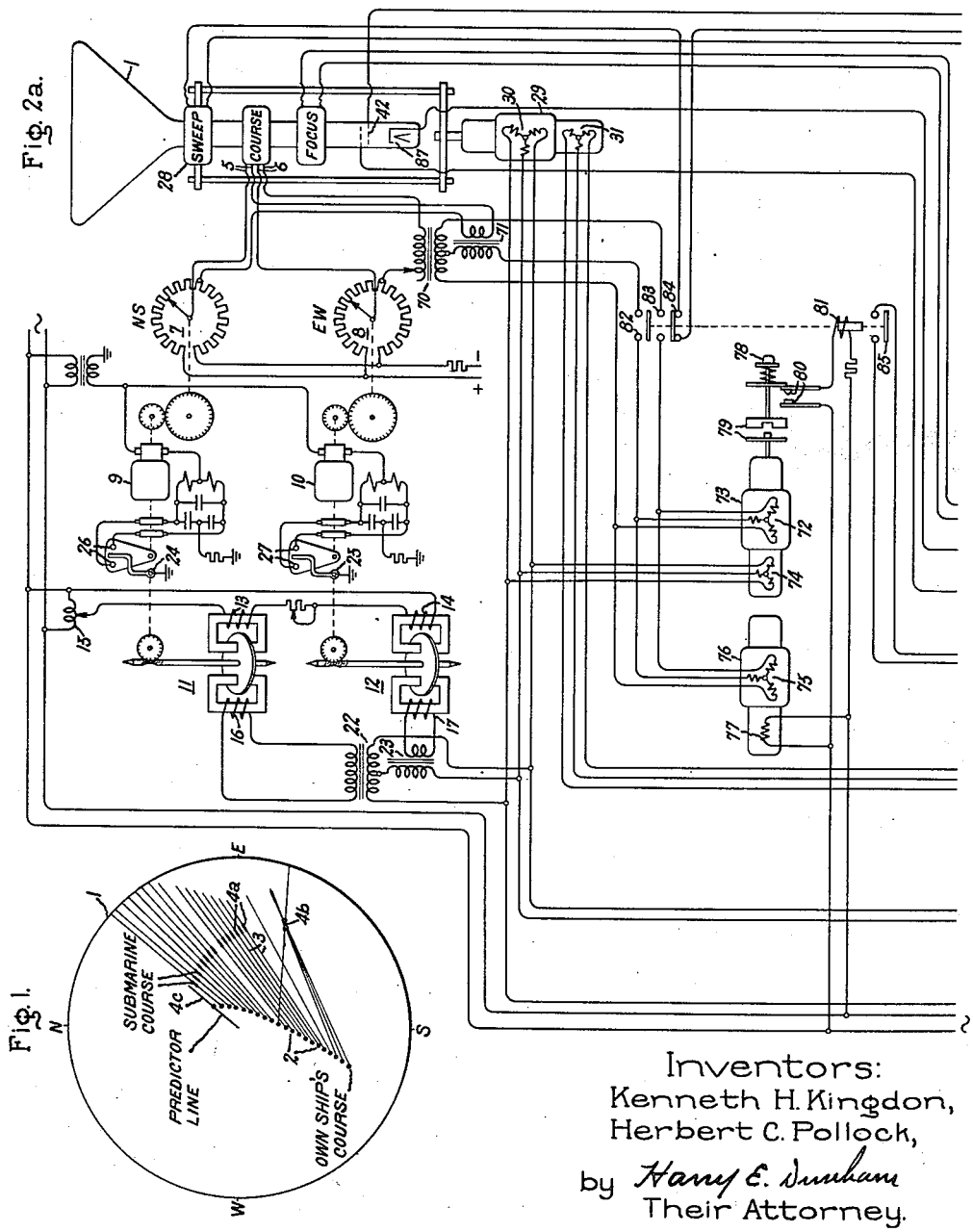
Inventors:
Kenneth H. Kingdon,
Herbert C. Pollock,
by Harry E. Dunham
Their Attorney.

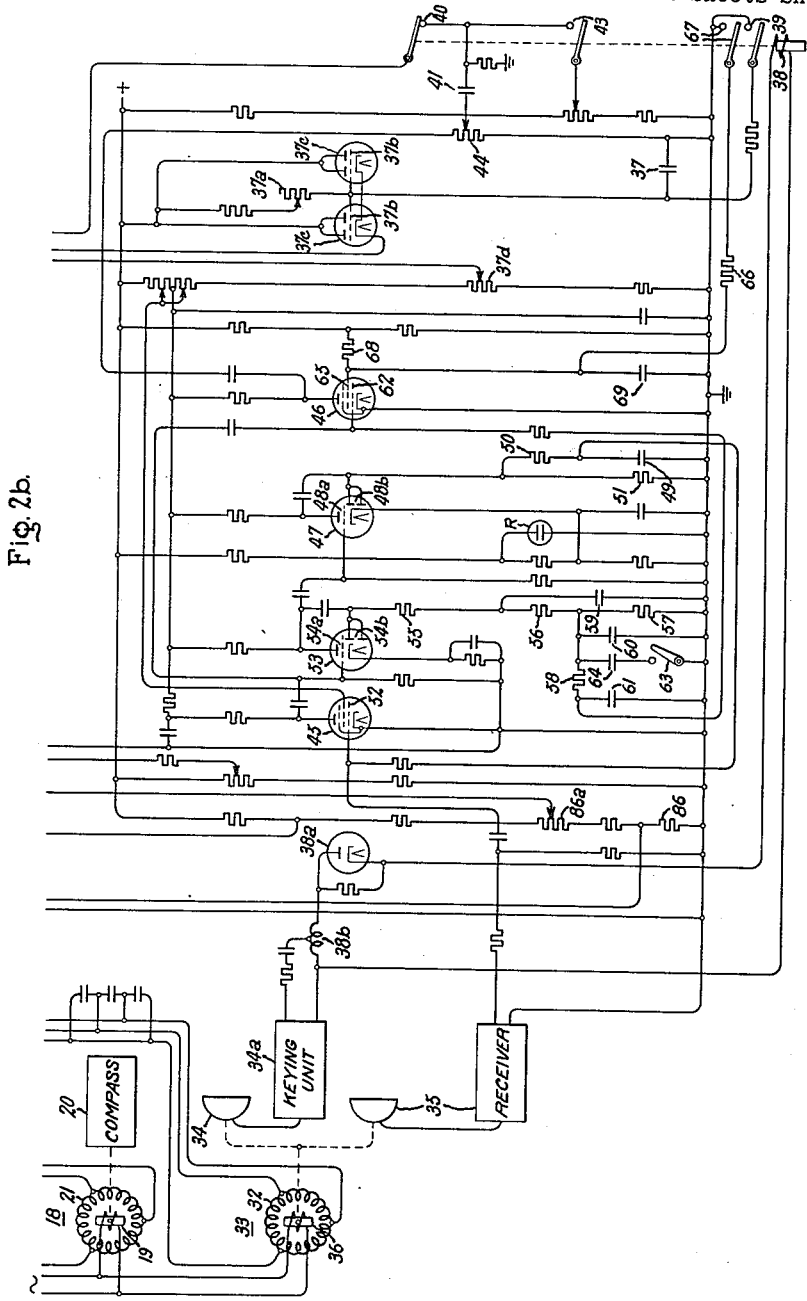

2,701,352

NAVIGATION APPARATUS

Kenneth H. Kingdon, Schenectady, N. Y., and Herbert C. Pollock, Eglin Field, Fla., assignors to General Electric Company, a corporation of New York Application July 13, 1943, Serial No. 494,564

10 Claims. (Cl. 340—3)

The present invention relates to apparatus utilizing information derived from instruments measuring "own ship's" heading and speed and from locating equipment measuring the direction and range of remote objects to display a coordinate record of "own ship's" course, the courses of other craft, the locations of fixed objects, and the use of the locating equipment. This record, which eliminates the need for visual observation in navigation and makes possible a more intelligent control of the use of the locating equipment, is useful under conditions in which normal vision is inadequate, such as in fog or darkness or in dealing with submarines.

The object of our invention is to provide an improved arrangement for coordinating information obtained from locating equipment so as to present a chart-like record.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which Fig. 1 represents a record produced by apparatus embodying our invention and Figs. 2a and 2b when placed side by side constitute a diagram of the apparatus.

Referring to the drawings, Fig. 1 represents the record produced on the viewing screen of a cathode ray tube 1 in which appear bright spots 2 representing "own ship's" successive instantaneous positions, faint traces 3 representing the directions and time of travel of wave energy radiated from the locating equipment, bright spots 4a representing the successive instantaneous positions of another craft, and a bright spot 4b representing a fixed object such as a buoy or lighthouse. The record on the screen, which lasts for an interval determined by the persistence of the screen, forms a map oriented in accordance with the compass points so that direction and distance may be read directly. The traces 3 are made by a beam starting coincident with the transmission of wave energy from the locating equipment from a point on the screen representing "own ship's" position and traversing the screen along a path representing the true bearing and at a speed representing the time of travel and return of the wave energy (the echo time). The beam is intensified at the start to provide the bright spots 2. When the wave energy from the locating equipment encounters an object, an echo is transmitted back to the equipment either by reflection or from transmission equipment carried by the object, and the elapsed time between transmission of the wave energy from the locating equipment and the receipt of the echo is a measure of the distance to the object. This is presented on the viewing screen by intensifying the beam coincident with the receipt of an echo to produce a bright spot on the trace providing a visual representation of the range and direction of the object. By moving the origins of the traces in accordance with the "own ship's" speed and heading, the origins of the traces represent the "own ship's" course, the traces represent the directions in which the locating equipment is being used, and the positions of the echoes on the traces represent the courses of other ships or the location of objects in the paths of the wave energy radiated by the locating equipment. By obtaining a visual representation of the "own ship's" course and the courses of other ships, navigation is simplified since the navigator always has a bird's eye view of the relative courses from which the proper course to be followed can be readily predicted. To aid in interpreting the record on the screen, the operator may at any time cause a deflection of the beam from the origin ("own ship's" instantaneous position) such as to mark a straight line 4c having a predetermined length and direction relative to the "own ship's" instantaneous position. This line, which may be called the "predictor line," serves as a scale which aids in the determination of the future course. In dealing with submarines, the predictor line 4c may have a length equal to the range of the depth charge gun so that the predictor line indicates the position a depth charge would land if the gun were aimed in the direction of the predictor line.

Since the record on the screen persists for only a few minutes, the early part is being continually erased so that only the useful part of the record remains on the screen. By marking on transparent plotting paper over the screen, a permanent record may be made.

The beam is deflected in accordance with "own ship's" position by NS and EW deflection coils 5 and 6 respectively energized from NS and EW potentiometers 7 and 8 positioned from a manually set starting position in accordance with the NS and EW components of "own ship's" speed. The potentiometers may be moved manually in accordance with information derived from instruments or automatically by equipment giving the NS and EW components of the ship's speed.

In the present construction the potentiometers 7 and 8 are moved respectively by reversible servomotors 9 and 10 controlled by watthour meters 11 and 12 having current coils 13 and 14 energized from a variable transformer 15 having a voltage set proportional to "own ship's" speed and having voltage coils 16 and 17 energized through a selsyn 18 having a rotor 19 positioned by the ship's compass 20 and having a stator 21 in which a voltage is induced having a magnitude varying sinusoidally from a maximum along the axis of the rotor to a minimum at right angles to the axis of the rotor. The induced voltage in the stator is resolved into NS and EW components by Scott connected transformers 22 and 23 having terminals respectively connected to three equidistant points on the stator 21. The NS component appears in transformer 22 connected to the voltage coil 16, and the EW component appears in the transformer 23 connected to voltage coil 17. The watthour meters, which turn at a speed proportional to the product of voltage (NS or EW component of "own ship's" heading) and current ("own ship's" speed), integrate with respect to time the NS and EW distances the ship moves in the respective directions. The watthour meters drive contacts 24, 25 which cooperate with contacts 26, 27, driven by the servomotors 9, 10, causing rotation of the servomotors in directions tending to keep the contacts 24, 25 centralized between the contacts 26, 27. The servomotors turn the potentiometers 7, 8 to cause deflection of the beam across the screen in accordance with the ship's instantaneous position so as to trace the ship's course in true bearing and distance.

The beam is additionally deflected to successive positions from which information is instantaneously obtained by the locating equipment by a sweep coil 28 rotatable about the throat of the cathode ray tube by a differential selsyn 29 having a winding 30 connected to the stator 21 of the compass selsyn 18 and having a winding 31 connected to the stator 32 of a selsyn 33 associated with the locating equipment. The locating equipment diagrammatically illustrated as comprising a projector 34 keyed by a keying unit 34a to transmit directional pulses of wave energy at the desired repetition rate and a receiver 35 for echoes. The type of locating equipment and the wave energy used in its operation varies with the conditions under which it is to be used. For the purposes of the present apparatus it is sufficient that the locating equipment be capable of measuring direction and range. The rotor 36 of the selsyn 33 is positioned in accordance with the instantaneous direction in which the locating equipment is effective to measure direction and range and the voltage induced in the stator 32 accordingly varies with the rotor position. In the differential selsyn 29 the voltage from the stator 32 reacts with the voltage from the stator 21 of the compass selsyn, causing rotation of the sweep coil to a position in which its deflecting axis lies along the true bearing of the direction in which the locating equipment is effective. The position of the deflecting axis of the sweep coil accordingly continuously represents the manner in which the locating equipment is being used.

The sweep coil is energized by a saw-tooth current controlled by the voltage across a condenser 37, shown in Fig. 2b, which voltage is restored to zero at the start of pulse transmission from the locating equipment and increases at a linear rate due to the charging of the condenser through adjustable resistance 37a. The voltage of condenser 37 is applied to the grids 37b of parallel tubes 37c in series with the sweep coil 28 through an adjustable resistance 37d. As the voltage of condenser 37 increases, the current through the sweep coil increases linearly at a rate dependent upon the adjustment of resistances 37a and 37d producing a deflection proportional to the time of travel of the wave energy during the interval between the transmission of a pulse of wave energy and the receipt of an echo. The sweep current is controlled by a relay 38 connected through a diode 38a across a reactance 38b in series with the keying unit so as to be operated during the pulse transmission. The diode prevents operation of the relay during negative pulses which may follow the positive keying pulses. The relay has a contact 39 which is momentarily closed to ground the left-hand electrode of condenser 37 during the pulse transmission and which opens at the end of the pulse transmission and permits the voltage across condenser 37 to rise linearly and cause a deflection of the beam along the true bearing of the transmitted pulse and at a rate dependent upon the time of travel. The trace of the sweep deflection represents the path along which the locating equipment is effective and the moving end of the trace continuously represents the position in range and direction of the point from which information is being obtained by the locating equipment.

The operation of the relay 38 also momentarily opens a contact 40 connecting a condenser 41 to the grid 42 of the cathode ray tube and closes a contact 43 connecting the condenser to the high side of the power supply. At the end of the pulse transmission the contact 43 is opened and the contact 40 is closed to apply the voltage of condenser 41 to the grid 42 to increase the beam intensity so as to produce the bright spots 2 marking "own ship's" position. The condenser 41 quickly discharges through a resistance 44, returning the beam intensity to normal after creating the spots 2.

The echoes picked up by the receiver 35 are fed through a two-stage resistance coupled amplifier described and claimed in U. S. Letters Patent No. 2,411,071—Wade, granted November 12, 1946 and assigned to the assignee of our present application, having a remote cut-off input tube 45 and a sharp cut-off output tube 46 connected through the resistance 44 and normally closed relay contact 40 to the grid 42 of the cathode ray tube so as to increase the beam intensity upon receipt of an echo and produce the spots 4a, 4b marking the position of the remote object. To improve the operation, part of the output of the tube 45 is fed through two stages of automatic volume control comprising tubes 47 and 53 having triode portions 48a, 54a, and diode portions 48b, 54b. The output of the tube 47, which has been amplified in the triode portions of the tubes 47 and 54, is fed through the diode portion 48b connected to a condenser 49 in parallel with resistances 50, 51. The time constant of the resistance-condenser network 49, 50, 51 is greater than the duration of the transmitted pulses but less than the interval between pulses so the voltage across the condenser 49 tends to assume a negative value dependent upon the average received signal level. The voltage of the condenser 49 is applied to the grid 52 of the input tube 45 so as to vary the gain of the tube in inverse proportion to the average signal level.

In the case of strong echoes, it is desirable that the gain of the amplifier be reduced after the first part of the echo is received so the amplifier will respond only to the leading end of the echo. This results in shorter marking on the screen from which the position of the remote object can be more accurately estimated. This object is attained by the automatic volume control tube 53 in which part of the amplified output of the triode portion 54a is fed through the diode portion 54b connected to a network comprising resistances 55, 56, 57, 58 and condensers 59, 60, 61. This network has a time constant less than the duration of the transmitted pulses so the negative voltage appearing across the condenser 61 follows the envelope of the echo pulse. The voltage from the condenser 61 is applied to the grid 62 of the sharp cut-off output tube 46 so as to cut the tube off when the envelope of the echo rises to a predetermined value. If the envelope of the echo rises above the predetermined value, the output of the tube 46 consists only of the preceding part which was below that value. In other words, the output of the tube 46 consists of only the leading end of the echo envelope. When the echoes are weak, the condenser 61 is shorted through a switch 63 and a large condenser 64 so the full echo strength flows through the amplifier.

To keep reverberations of the transmitted pulses from nearby water and objects off the screen of the cathode ray tube, the screen grid 65 of the amplifier output tube 46 is connected to ground through a resistance 66 by normally open contacts 67 of the relay 38 which are closed during transmission. The screen grid regains its normal voltage at a rate determined by a resistance 68 and a condenser 69. Grounding of the screen grid of the tube 46 prevents modulation of the beam of the cathode ray tube by pulses picked up by the receiver directly from the transmitter.

At any time during operation of the apparatus, the sweep current may be interrupted and an alternating voltage may be superimposed on the voltages of the NS and EW potentiometers 7 and 8, causing a deflection of the beam forward and backward from the origin ("own ship's" position) along a path determined by the NS and EW components of the superimposed voltage so as to trace the "predictor line" 4c. Only the forward part of the predictor line is significant. The alternating voltages are obtained from Scott connected transformers 70 and 71 connected to the stator 72 of a differential selsyn 73. The rotor 74 of the differential selsyn 73 is connected to the stator 21 of the compass selsyn and accordingly has a voltage induced therein dependent upon "own ship's" heading. The stator of the differential selsyn is also connected to the stator 75 of a selsyn 76 having a rotor 77 energized in parallel with the rotors of selsyns 18 and 33. The rotor 74 of the differential selsyn 73 is manually positionable by a knob 78 after the knob is pushed inward to engage a clutch 79. The voltage induced in the stator 72 depends upon the "own ship's" compass heading and upon the angle the rotor 74 is turned by the knob 78. The NS and EW components of the voltage of the stator 72 appear respectively in the transformers 71 and 70 and cause a deflection of the beam back and forth along a line determined by (1) the "own ship's" compass heading and (2) the angle the rotor 74 has been turned by the knob 78. In attacking submarines, the length of the line (the "predictor line") may conveniently be the range of a depth charge gun, in which case the forward end of the line indicates the spot at which the depth charge would land if the gun were trained at the angle with reference to the ship that the knob 78 has been turned. The angle of train for the gun can be obtained from the position of the rotor 77 which assumes a position corresponding to "own ship's" true heading plus or minus the angle due to the turning of the knob 78.

In pushing the knob 78 inward to adjust the angle of the predictor line, contacts 80 are closed energizing a relay 81 which (1) closes switches 82, 83 in circuit with the transformers 70, 71 so as to apply the predictor line voltages in series with the potentiometers 7 and 8, (2) opens a switch 84 in series with the sweep coil 28 permitting the beam to return to the initial position ("own ship's" position) determined by the potentiometers 7 and 8, and (3) closes a switch 85 shorting a resistor 86 connected to the cathode 87 of the cathode ray tube so as to increase the beam intensity. The normal beam intensity is adjustable by variable resistance 86a which varies the cathode potential. By periodically placing the predictor line on the screen, the operator is able to judge how the ship should be maneuvered to bring it within range of a submarine. From another aspect, the predictor line can be used to estimate how the ship should be maneuvered to keep at a safe distance from a buoy or another ship.

As an example of the use of the apparatus, the operation will be explained for the case of a destroyer having supersonic locating equipment adjusted for detecting objects within a range of 1000 yards. For this condition, the keying unit 34a is adjusted to cause the transmission of 1/10 second pulses at intervals of 1¼ second and the resistances 37a and 37d are adjusted to provide a sweep length of 4 inches (250 yards/inch). The resistance 86a is adjusted so the sweep intensity is just visible, the switch 63 is closed, short circuiting the automatic volume control, the transformer 15 is set to the destroyer's speed, and the potentiometers 7 and 8 are manually adjusted periodically to keep the destroyer's position 2 near the center of the cathode ray tube screen.

After making contact with a submarine, the potentiometers 7 and 8 are adjusted to bring the submarine's position 4a near the center of the screen and the switch 63 is opened to sharpen the indication of the submarine's position. From this point, a chart-like record of the courses of the destroyer and submarine and of the use of the locating equipment appears on the screen of the cathode ray tube in true bearing and scale. If the operator of the locating equipment loses the submarine, the record of the submarine's course is of considerable assistance in regaining contact. From time to time the predictor line is placed on the screen and trained in the direction the depth charge gun is expected to be fired both to provide a measure of the distance to the submarine and to inform the gun operator through the position of the selsyn rotor 77 of the direction the gun should be trained to be ready for firing when the destroyer reaches the proper position.

While we have shown particular embodiments of our invention, it will be understood that many modifications may be made without departing from the spirit thereof, and we contemplate by the appended claims to cover any such modifications as fall within the true spirit and scope of our invention.

What we claim as new and desire to secure by Letters Patent of the United States is:

1. Navigation apparatus for presenting information derived from a craft's equipment for measuring range and direction along lines of sight from the craft comprising, a persistent fluorescent screen, means for producing traces on the screen representing the instantaneous directions in which said equipment is oriented, means for moving the origin of said traces in accordance with the heading and speed of the craft, and means for modulating said traces at points corresponding to the ranges of objects on said directions of orientation of said equipment whereby the resultant image on the screen represents the course of the craft, the locations of objects and the courses of the other craft within the range of the equipment, and the directions of operation of the equipment.

2. Navigation apparatus for presenting information derived from a craft's equipment for measuring range and direction along lines of sight from the craft comprising, a persistent fluorescent screen, means for producing traces on the screen representing the instantaneous lines of sight from the equipment, means for moving the origin of said traces in accordance with the heading and speed of the craft, means for modulating said traces at points corresponding to the ranges of objects on said lines of sight whereby the resultant image on the screen represents the course of the craft, the locations of objects and the courses of other craft within the range of the equipment, and the directions of operation of the equipment, and means for producing on the screen a trace having its origin at the instantaneous position of the craft and having a length providing a scale for estimating distances.

3. Navigation apparatus for presenting information derived from a craft's equipment for measuring the range of objects by the time of travel of wave energy along lines of sight from the craft, comprising a persistent fluorescent screen, a beam for illuminating the screen, means for periodically positioning the beam in initial positions in accordance with the craft's instantaneous position whereby the successive initial positions of the beam plot the course of the craft, means for periodically deflecting the beam from said initial positions at speeds proportional to the time of travel of wave energy and in directions corresponding to the instantaneous lines of sight of the equipment whereby the traces on the screen represent the direction and range of the equipment, and means for modulating the beam at positions corresponding to the range of objects or other craft on said lines of sight whereby the modulation plots the position of said objects and the course of said other craft.

4. Navigation apparatus for presenting a chart-like record of information obtained from instruments measuring "own ship's" speed and bearing and from locating equipment determining the position of remote objects comprising, means for indicating "own ship's" instantaneous position, means for displacing the indication of "own ship's" position in accordance with the heading and distance travelled whereby the successive indications trace "own ship's" course, and indicating means responsive to the direction and range of locating equipment for indicating the positions of remote objects with respect to "own ship's" instantaneous positions whereby the successive indications of the locating equipment trace the courses or positions of remote objects.

5. Navigation apparatus for presenting information derived from locating equipment measuring direction and range of remote objects comprising, a means for displaying a chart-like record of "own ship's" course, locating equipment for measuring the direction and range of remote objects from "own ship's" instantaneous position, indicating means for marking the positions of remote objects on said record with reference to predetermined points, and means for successively positioning said predetermined points at the corresponding "own ship's" instantaneous positions.

6. Navigation apparatus comprising, means for displaying a chart-like record of "own ship's" course, locating equipment having means for indicating the position of remote objects in direction and range from a predetermined reference point, and means for shifting said reference point in accordance with "own ship's" instantaneous position whereby the courses of moving objects appear in true relation to "own ship's" course.

7. Navigation apparatus comprising, means for displaying a chart-like record of "own ship's" course, locating equipment having means for indicating the position of remote objects in direction and range from a predetermined reference point in accordance with "own ship's" instantaneous position whereby the courses of moving objects appear in relation to "own ship's" course, and means for producing indications having a predetermined range and bearing from "own ship's" instantaneous positions to serve as a scale for estimating distances.

8. In navigation apparatus, a screen, indicating means producing an indication on the screen representing "own ship's" position in accordance with voltages from potentiometer settings, locating equipment for indicating on the screen the positions of remote objects with reference to "own ship's" position, and means for superimposing on the potentiometer voltages an alternating voltage to produce an indication of a predetermined distance from "own ship's" position.

9. Apparatus for measuring range and direction comprising an indicating unit having a cathode ray tube with a persistent fluorescent screen, means for deflecting the beam of said tube, means for cyclically varying the energization of said deflecting means to produce traces on said screen, means for orienting the direction of deflection of said deflecting means corresponding to the direction of measurement of said apparatus, means for varying the relationship between the direction of deflection of said deflecting means and direction of measurement of said apparatus as a function of the true bearing of said indicator unit, and means for varying the intensity of said beam to modulate said traces at points corresponding to the ranges of objects from said apparatus.

10. Apparatus for measuring range and direction comprising an indicator unit having a cathode ray tube with a persistent fluorescent screen, a magnetic deflecting coil for deflecting the beam of said tube, means for cyclically varying the energization of said coil to produce traces on said screen, means for rotating said coil as a function of the direction of measurement of said apparatus, means for varying the relation between the rotation of said coil and the direction of measurement of said apparatus as a function of the true bearing of said indicator unit, and means for varying the intensity of said beam to modulate said traces at points corresponding to the ranges of objects from said apparatus.

UNITED STATES PATENTS

References Cited in the file of this patent

| 1,225,796 | Fricke | May 15, 1917 |
| 2,209,191 | Dearing | July 23, 1940 |
| 2,225,046 | Hunter | Dec. 17, 1940 |
| 2,231,929 | Lyman | Feb. 18, 1941 |
| 2,296,032 | Hammond | Sept. 15, 1942 |

FOREIGN PATENTS

| 490,599 | Great Britain | Aug. 16, 1938 |